(12) United States Patent
Stuart

(10) Patent No.: US 9,577,843 B2
(45) Date of Patent: Feb. 21, 2017

(54) METHOD AND SYSTEM TO ROUTE A VOIP CALL TO A REPRESENTATIVE AT A PROVIDER'S SITE

(75) Inventor: Erik Anderson Stuart, San Mateo, CA (US)

(73) Assignee: PAYPAL, INC., San Jose, CA (US)

( * ) Notice: Subject to any disclaimer, the term of this patent is extended or adjusted under 35 U.S.C. 154(b) by 1932 days.

(21) Appl. No.: 11/640,651

(22) Filed: Dec. 18, 2006

(65) Prior Publication Data

US 2008/0144802 A1    Jun. 19, 2008

(51) Int. Cl.
*H04L 12/66* (2006.01)
*H04M 7/00* (2006.01)

(52) U.S. Cl.
CPC .............. *H04L 12/66* (2013.01); *H04M 7/003* (2013.01); *H04M 7/006* (2013.01)

(58) Field of Classification Search
None
See application file for complete search history.

(56) References Cited

U.S. PATENT DOCUMENTS

| | | | |
|---|---|---|---|
| 6,934,380 B2 * | 8/2005 | Shaffer et al. | 379/265.03 |
| 7,269,160 B1 * | 9/2007 | Friedman et al. | 370/352 |
| 7,676,034 B1 * | 3/2010 | Wu et al. | 379/265.01 |
| 2003/0086557 A1 * | 5/2003 | Shambaugh et al. | 379/266.07 |
| 2003/0112945 A1 * | 6/2003 | Brown et al. | 379/201.01 |
| 2003/0169870 A1 * | 9/2003 | Stanford | 379/265.12 |
| 2003/0223565 A1 * | 12/2003 | Montemer | 379/218.01 |
| 2006/0074760 A1 * | 4/2006 | Helin et al. | 705/26 |
| 2007/0003038 A1 * | 1/2007 | Siegel et al. | 379/201.01 |
| 2007/0092071 A1 * | 4/2007 | Grell | 379/93.12 |
| 2008/0046550 A1 * | 2/2008 | Mazur et al. | 709/223 |

OTHER PUBLICATIONS

Tehrani, Rich, "Web 2.0 meets VoIP and Call Center 2.0", http://blog.tmcnet.com/blog/rich-tehrani/call-center/web-20-meets-voip-and-call-center20.html, VoIP Blog—Tehrani.com, (Oct. 27, 2006).

* cited by examiner

*Primary Examiner* — Brian Roberts
(74) *Attorney, Agent, or Firm* — Maschoff Brennan

(57) ABSTRACT

A method and system to contact a provider are described. The system may include a communication module to detect a voice over Internet protocol (VoIP) call to a seller; a suitable representative associated with the seller; a decision module to determine, utilizing the detected VoIP call to the seller; and a call routing module to route the VoIP call to the suitable representative.

19 Claims, 8 Drawing Sheets

METHOD AND SYSTEM TO ROUTE A VOIP CALL TO A REPRESENTATIVE AT A PROVIDER'S SITE

TECHNICAL FIELD

This application relates to electronic commerce in general and a method and system to route a voice over Internet protocol (voice over IP or VoIP) call to a representative at a provider's site in particular.

BACKGROUND

Electronic commerce (e-commerce) marketplace may provide a powerful online platform for the sale of goods and services by a community of individuals and small businesses. On any given day, there may be a great number of items available through auction-style and fixed-price trading. A buyer may search for items that may be available in the e-commerce marketplace and that satisfy certain criteria. In response to a search request, the buyer may be presented with a plurality of listings, from which the buyer may select a specific item. Information related to the selected item may then be displayed to the buyer via an associated user interface. The information related to the selected item may include an image representing the item, a description of the item, and an information associated with the seller.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

The method and the system are described to route voice over Internet protocol (voice over IP or VoIP) calls from a buyer to a seller destination such that a VoIP call is routed to a suitable representative at the seller's site. In the context of the electronic commerce (e-commerce) marketplace, a provider of on-line services may facilitate functionality that allows a buyer to initiate a contact with a seller by placing a VoIP call to the seller. A VoIP call may be placed to a specific seller, e.g., to the seller of a particular item that is being viewed by a buyer via a view item page, or to a seller selected by a referral system. It will be noted that, for the purposes of this description, the term "seller" may be used interchangeably with a term "provider" and will be understood to include providers of goods or services. It will be also noted that the term "buyer" will be understood to include a user who may be a potential buyer in the ecommerce marketplace.

The VoIP call may be detected at a network-based transaction facility that provides the online services. The call may be then processed by a VoIP application hosted by the network-based transaction facility. Various predetermined business rules and logic may be utilized to determine a suitable representative to take the VoIP call from the buyer at the seller's system. The VoIP application may route the VoIP call to that determined suitable representative at the seller's site. The method and system to route the VoIP call may be implemented, in one example embodiment, in the context of a network environment 100 illustrated in FIG. 1.

Figure 1:
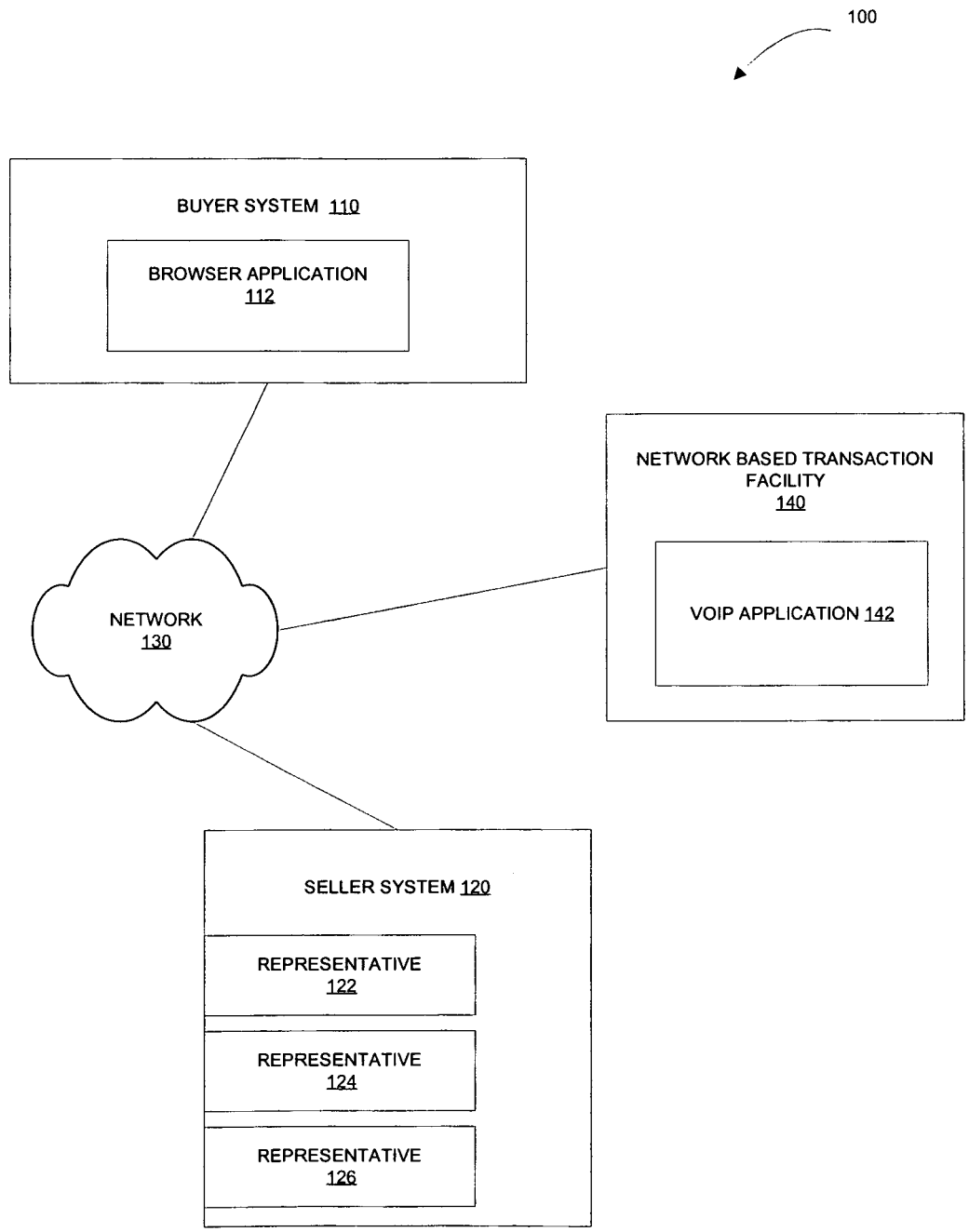
FIG. 1 is a diagrammatic representation of a network environment within which an example embodiment may be implemented.

As shown in FIG. 1, the network environment 100 may include a buyer system (or merely a buyer) 100, a seller system (or merely a seller) 120 and a network-based transaction facility 140. The buyer system 110 may run a browser application 112 and may have access to the network-based transaction facility 140 via a communications network 130. The communications network 130 may be a public network (e.g., the Internet, a wireless network, etc.) or a private network (e.g., LAN, WAN, Intranet, etc.).

The buyer 110 may utilize the browser 112 running on the current system 110 to access services provided by the network-based transaction facility 140. One of the services provided by the facility 140 is a VoIP application 142 that may be configured to route VoIP calls from the buyer 110 to a suitable representative associated with the seller 120. For example, the seller system 120 may be associated with a number of representatives that may be capable of taking VoIP calls from buyers from their respective representative stations. As shown in FIG. 1, the seller system 120 includes representative station 122, representative station 124 and representative station 126.

Where the representatives of the seller associated with the seller system 120 are answering VoIP calls utilizing VoIP software (VoIP client) installed at their respective stations, a routed VoIP call to the selected representative is effectuated to the associated VoIP client, e.g., via a peer to peer (P2P) connection or utilizing an intermediary server system. If the representatives of the seller associated with the seller system 120 do not have access to a VoIP service at their respective stations, but have access to conventional telephone devices, a routed VoIP call to the selected representative is directed to a conventional telephone device associated with the selected representative, via a connection that may utilize a VoIP server. A conventional telephone device may be associated with the basic service supplying standard single line telephones, telephone lines, and access to the public switched network.

When the buyer initiates a VoIP call to a seller's system that is associated with multiple representatives who could potentially answer the VoIP call, the VoIP call is detected by the VoIP application 142. The VoIP call from the buyer's system is processed by the VoIP application 142 to determine a suitable representative at the seller system 120. It will be noted that, in one example embodiment, a VoIP call initiated on behalf the buyer may be detected and processed by the VoIP application 142.

In one example embodiment the routing of a VoIP call to a suitable seller or representative may be implemented in various contexts within the network-based transaction facility 140. For example, a technique to route VoIP calls may be utilized by an on-line trading platform, in conjunction with an on-line service that provides VoIP functionality to buyers directly from a view item page. In this scenario, a buyer may search listings for a desired item or service that may be available in an e-commerce marketplace, select an item by clicking on a particular listing, and view the details of the listing in a separate window. The separate window may be termed a view item page. An example view item page will be described further below with reference to FIG. 5.

A view item page may include specific information about the item as well as information about the seller. In addition to information associated with the seller, the view item page may also include a control that permits a user to initiate a VoIP call to the seller. In this context, a VoIP call may be processed by the VoIP application 142 hosted by the network-based transaction facility 140. The VoIP application 142 may be configured to process a VoIP call from the buyer system 110 by applying predetermined business rules or any additional information retrieved from various databases, and select a suitable representative at the seller system 120 based on the results of the processing. The VoIP application 142 may then route the VoIP call to the selected suitable representative.

The selection of a suitable representative, in one example embodiment, is made based on a variety of factors. For example, the logic associated with the VoIP application 142 may analyze the buyer's identification (ID) information and determine that the buyer has a so-called "preferred customer" status. If the business rules indicate that a VoIP call from a preferred customer is to be routed to a more experienced sales representative, the VoIP application 142 may determine a more experienced representative associated with the seller system 120 and route the VoIP call to such representative.

In a different scenario, if the VoIP application 142 has access to information indicating that a particular buyer who is initiating a VoIP call has had contact with a particular representative at the seller's site, the VoIP application 142 may route the VoIP call to that particular representative. In yet another scenario, the VoIP application 142 may be configured to analyze the seller's ID and the specific characteristics of representatives associated with the seller and route the VoIP call based on those characteristics. The characteristics may include availability of a representative, the language spoken by a representative, the particular area of expertise of a representative.

The method and the system to route the VoIP call from a buyer to a specific representative at a seller's site may be advantageously utilized in the context of a so-called pay per lead system. A pay per lead system may be implemented as an on-line referral service. An on-line referral service may be configured to respond to a referral request from a user by automatically selecting a suitable provider and automatically routing a voice over Internet protocol (VoIP) call to the selected provider. A suitable provider may be selected from one of several providers within a network of providers. A VoIP call to the selected provider may be treated as an indication of a potential business opportunity (a lead) for the provider. The provider may then be charged with a predetermined fee for each lead generated by the example referral service.

When a VoIP call is initiated by a potential buyer to a seller in the context of a pay per lead system, the VoIP call may be routed to a suitable representative at the seller's site. A pay per lead system, as well as a system to provide to users VoIP functionality from a view item page, may be hosted by an e-commerce server. An e-commerce server may be part of the network-based transaction facility 140 of FIG. 1. An example e-commerce server may be described with reference to FIG. 2.

Figure 2:
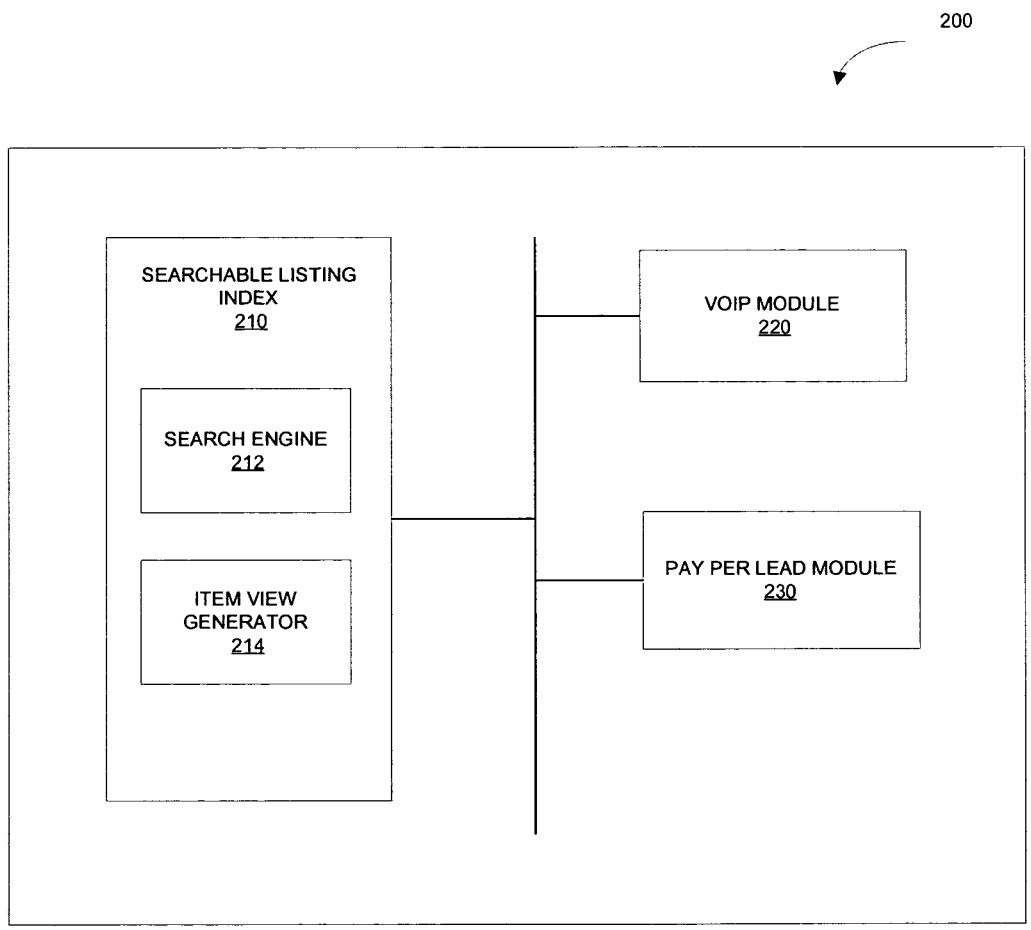
FIG. 2 is a block diagram of an e-commerce server in accordance with one example embodiment.

FIG. 2 illustrates an e-commerce server 200 in accordance with one example embodiment. The e-commerce server 200 may be maintained at a network-based transaction facility 140 illustrated in FIG. 1. The e-commerce server 200 may include a searchable listing index 210, a VoIP module 220 and a pay per lead (PPL) module 230. The searchable listing index 210 may be configured to maintain descriptions of specific products, services, digital goods, or other transaction opportunities, of which a buyer may want to avail himself. It will be noted, that the term "transaction" will be understood to apply, for example, to a product, a service, a digital good, an employment opportunity, an offer to swap a an item (e.g., a compact disc (CD, a vacation property, etc.), as well as to other paradigms.

The searchable listing index 210 may include a search engine 212 and an item view generator 214. The search engine 212, in one example embodiment, is configured to generate and display listings in response to a search request by a user. The item view generator 214 may be configured to generate a view, e.g., a web page, describing the item selected from the listings provided by the search engine 212.

A view generated by the item view generator 214 may generate an item view page that displays information associated with the item and information associated with the seller. The item view page may also include a visual control, e.g., a VoIP control button, to permit a user to contact a seller by initiating a VoIP call to the seller. The PPL module 230 in one example embodiment may be configured to receive referral requests from users to generate referrals and provide the referrals to the user and to facilitate a user contact with that referred seller by means of a VoIP call to the seller. The VoIP module 220 may be configured to process VoIP calls from a buyer to a seller by applying business logic and selection criteria and to route the VoIP call to a suitable representative at the seller's site. An example VoIP module may be described with reference to FIG. 3.

Figure 3:
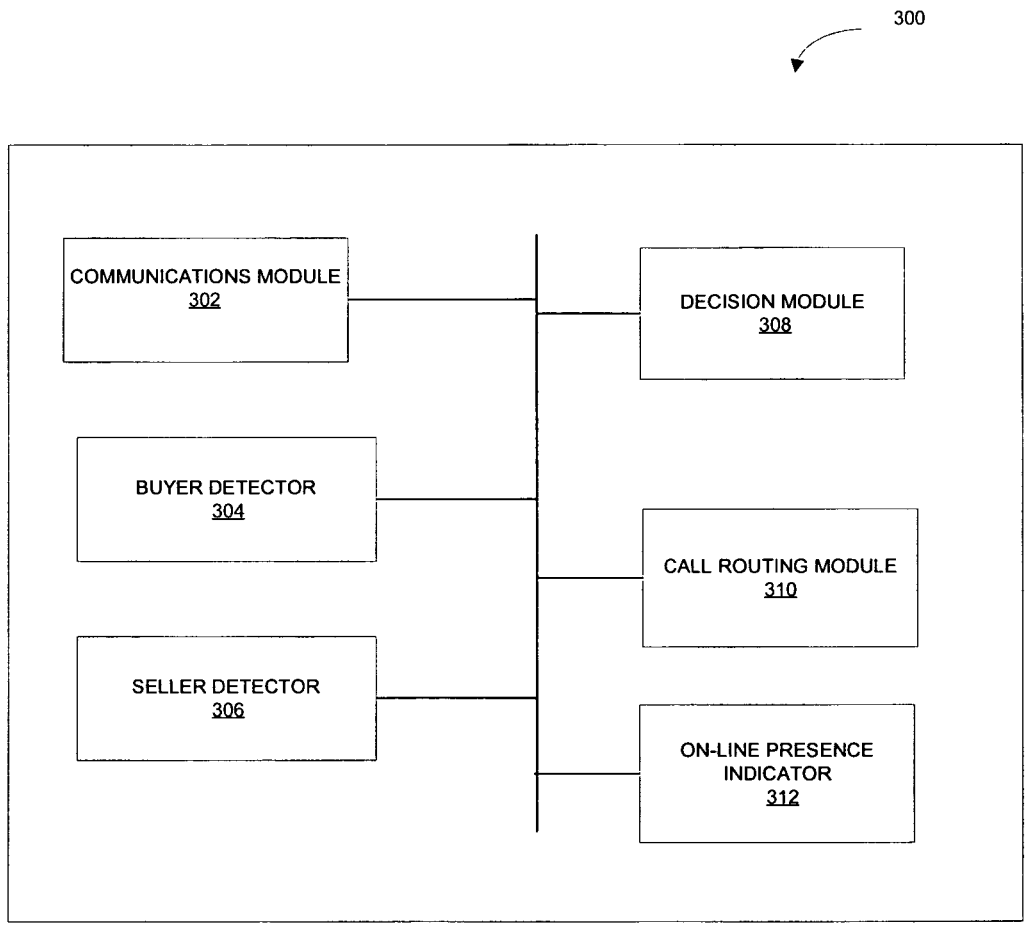
FIG. 3 a block diagram of a VoIP module, in accordance with an example embodiment.

FIG. 3 is a block diagram of a VoIP module 300, in accordance with one example embodiment. The VoIP module 300 may include a communications module 302, a buyer detector 304, a seller detector 306, a decision module 308, and a call routing module 310. The communications module 302 may be configured to detect VoIP calls from a buyer to a seller, where the buyer and the seller have access to services provided by the network based transaction facility 140 of FIG. 1. It will be noted that the communications module 302 may be configured to detect a call from any user of a network-based transaction facility to any other user of the network-based transaction facility.

The buyer detector 304 may be configured to analyze the VoIP call received by the communications module 302 and to determine the identification information associated with the buyer. The seller detector 306 may be configured to determine the identification information associated with the seller. The information detected by the buyer detector 304 and the seller detector 306 may be then utilized by the decision module 308. The decision module 308, in one example embodiment, may be configured to select a suitable representative at the seller's site based on predetermined business rules and various selection criteria.

The decision module 308 may, in one example embodiment, route the VoIP call to the first available representative at the seller's site. The availability of a representative may be determined in one embodiment by an online presence indicator 312. Another example criteria may be prior exposure of the buyer to a particular representative. Based on the buyer identification information determined by the buyer detector 304, the decision module 308 may be capable of determining whether any of the representatives at the seller's site have been contacted by that buyer any time prior to the current VoIP call. If it is determined that the buyer has had contact with a particular representative at the seller's site, the decision module 308 may route the VoIP call to that representative.

Other criteria that may be used by the decision module 308 may include the buyer's stratus or ranking with respect to services provided by the network-based transaction facility 140. For example, a buyer may have a preferred customer status with respect to the services provided by the network-based transaction facility 140. The decision module 308 may be configured to route VoIP calls from preferred customers to more experienced representatives at the seller's site. Some other criteria that may be utilized by the decision module 308 may include information such as languages spoken by a representative and a particular area of expertise of the representative. For example, if the VoIP call is associated with a sale of electronics, the decision module 308 may route the VoIP call to a representative at the seller's site who is indicated to have experience in electronics sales.

The call routing module 310, in one example embodiment, may be configured to receive the result of the processing performed by the decision module 308 and to route the VoIP call to a suitable representative at the seller's site. It will be noted that, in some example embodiments, the functions performed by two separate modules of the VoIP module 300 may be performed by a single module. For example, the operations performed by the buyer detector 304, the seller detector 306, and the decision module 308 may be performed by a single module. In another example embodiment, the operations performed by the decision module 308 may be performed by several functional components, e.g., by a business rules engine, an on-line presence detector, a language matching module, etc.

Figure 4:
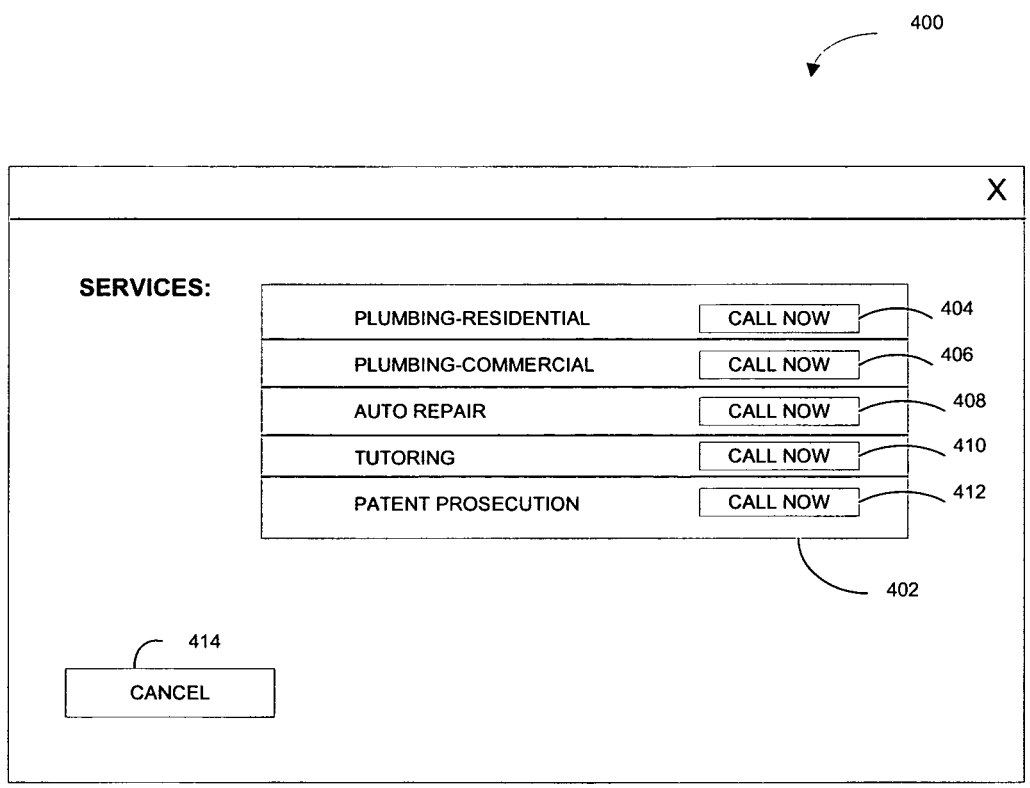
FIG. 4 is a diagrammatic representation of an example user interface to permit a user to request a referral, in accordance with an example embodiment.

As mentioned above, the VoIP module 300 may be utilized by users utilizing a searchable listing index, by users utilizing an on-line referral service, as well as by users of other services related to e-commerce in general and to on-line trading platform in particular. FIG. 4 is a diagrammatic representation of an example user interface 400, that may be associated with the PPL module 208 of FIG. 2, to permit a user to request a referral. The user interface 400, in accordance with an example embodiment, comprises a services area 402. The services area 402 may include a list of different services or different types of a particular service (e.g., "PLUMBERS—RESIDENTIAL" and "PLUMBERS—COMMERCIAL"). Each service from the list of services may be displayed with an associated "CALL ME" control button, such as control buttons 404 through 412. In one example embodiment, when a user wishes to contact a provider, e.g., a tutor, the user may simply click on the "CALL ME" button 410 associated with tutoring services. In response, the PPL module 208 may select a provider, e.g., utilizing business rules, and initiate a VoIP call to the selected provider. If the selected provider answers the call, the user may proceed with communicating with the selected provider.

In one example embodiment, the user interface 400 may include a "CANCEL" control 414 that can be used to exit the user interface 400 and terminate any selection or calling process. It will be noted, that the user interface 400, in one example embodiment, may include a goods area (not shown) to permit a user to request a suggested retailer information.

Figure 5:
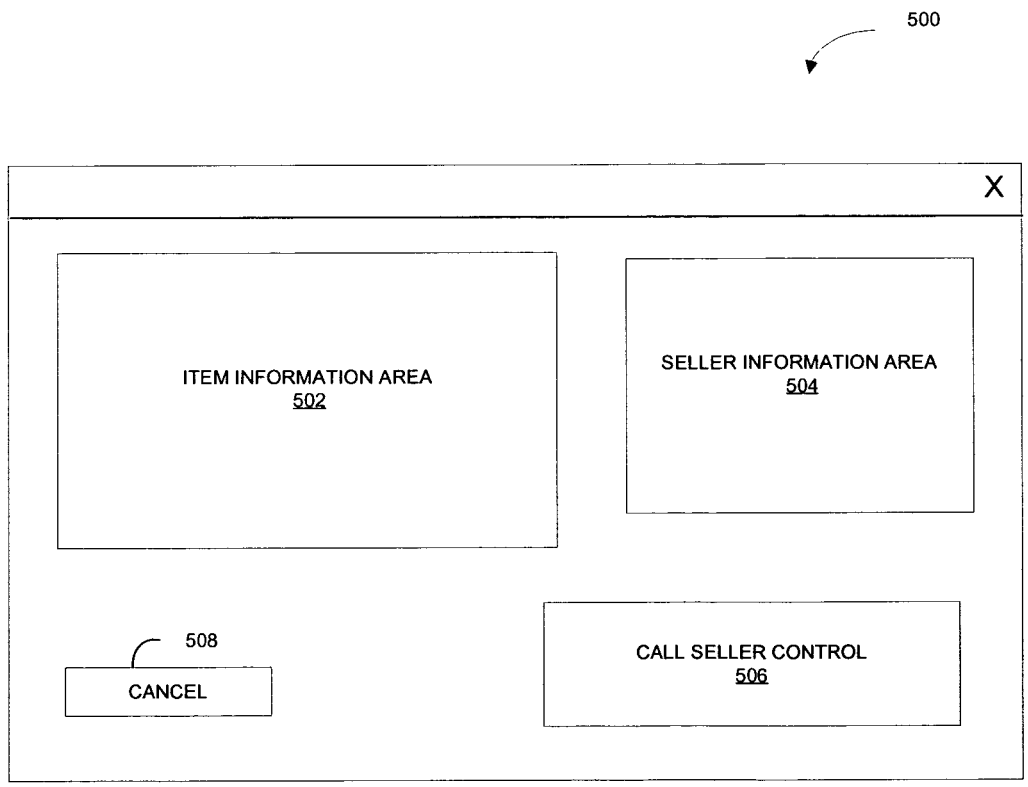
FIG. 5 is a diagrammatic representation of an example user interface to provide VoIP functionality to a user, in accordance with an example embodiment.

An example user interface to permit a buyer to initiate a VoIP call to the seller from a view item page may be discussed with reference to FIG. 5. FIG. 5 shows an example user interface in an embodiment of a view item page 500. The view item page 500 may include an item information area 502, a seller information area 504, a "CALL SELLER" control 506 and a "CANCEL" control 508. The item information area 502 may be utilized to present details describing an item. The seller information area 504 may include various information related to the seller, such as seller's ratings, seller's email address, alternative seller contact information, and so on. The "CALL SELLER" control 506, in one example embodiment, may be utilized to permit a user to initiate a VoIP call to the seller. The "CANCEL" control 508 may be utilized to exit the user interface and terminate any ongoing actions associated with the user interface 500. A VoIP call initiated by a user by actuating the CALL SELLER" control 506 may be routed to a suitable representative at the seller site by the processing logic associated with the VoIP module 300 of FIG. 3. An example method to route a VoIP call to a suitable representative at the seller's site can be described with reference to FIG. 6.

Figure 6:
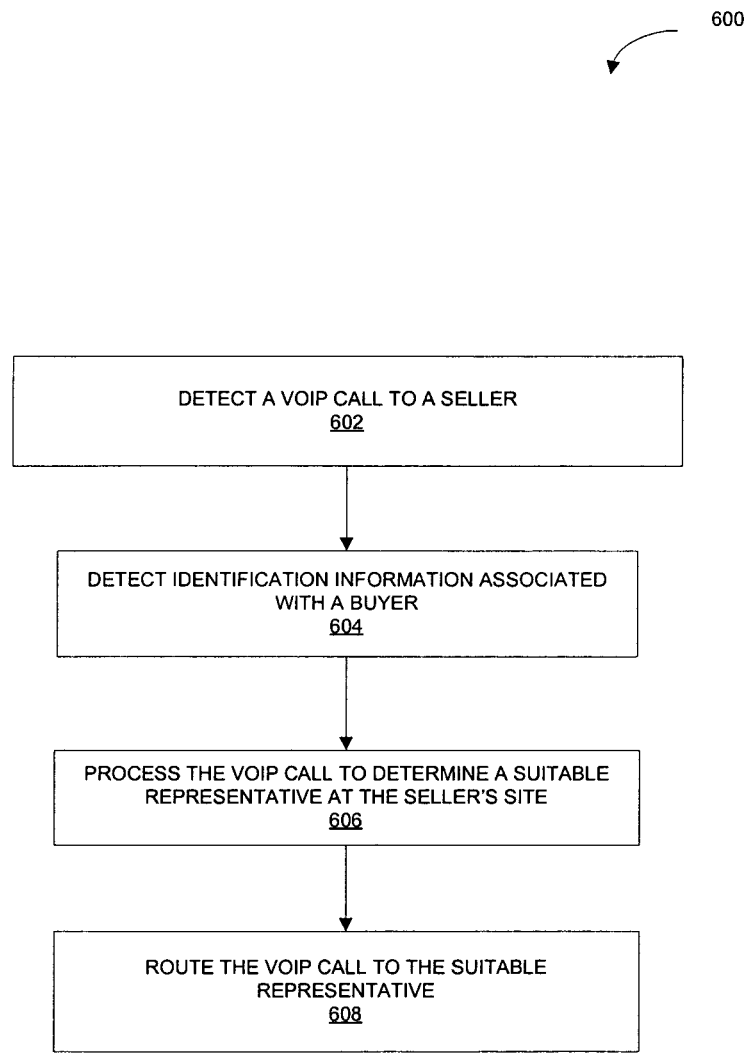
FIG. 6 is a flow chart of a method to route a VoIP call to a suitable representative of at a provider's site, in accordance with an example embodiment.

FIG. 6 is a flow chart of a method 600 to route a VoIP call, according to one example embodiment. The method 600 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the e-commerce server 200 of FIG. 2 and, specifically, at the VoIP module 220. In another example embodiment, the processing logic may be distributed between various servers at the network based transaction facility 140 of FIG. 1.

As shown in FIG. 6, at operation 602, the communications module 302 of the VoIP module 300 detects that a buyer initiated a VoIP call to a seller. Alternatively, the communications module 302 may receive a request from a buyer to launch a VoIP call to a seller on behalf of the buyer. At operation 604, the buyer detector 304 determines identification information associated with the buyer who is the initiator of the VoIP call and the method 600 continues to operation 606. At operation 606, the decision module 308 processes the VoIP call to determine a suitable representative at the seller's site. The decision module 308 may utilize business rules and/or various selection criteria to determine a suitable representative. The decision module 308 may also first determine that the target recipient of the VoIP call is associated with the multiple representatives before initiating or engaging a selection process. In response to determining a suitable representative at the seller's site, or in response to determining that a single representative is associated with the seller's site, the method 600 engages the call routing module 310 and the VoIP call is routed to the determined representative at operation 608.

Figure 7:
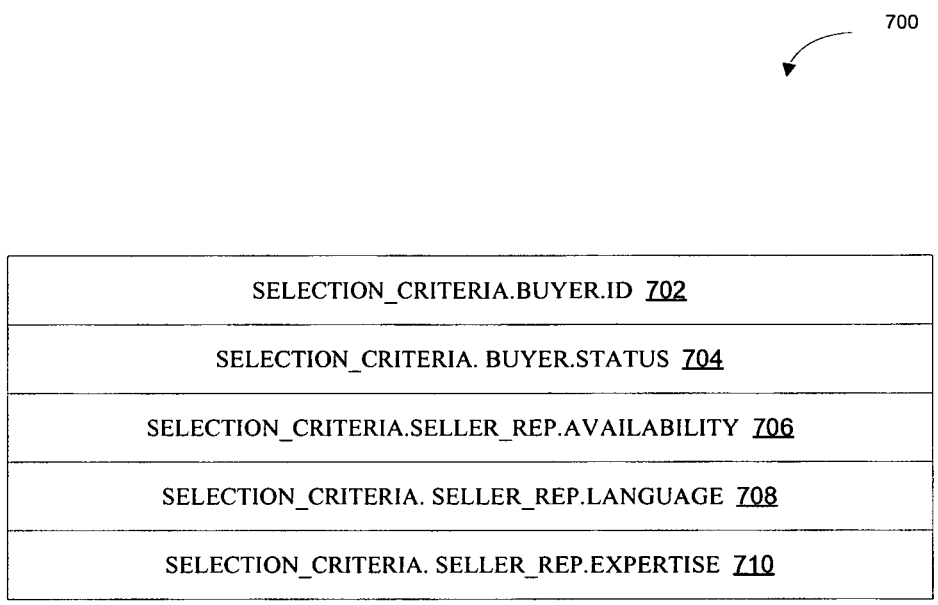
FIG. 7 is a diagrammatic representation of an example data structure to represent criteria information to select a suitable representative at a provider's site, in accordance with an example embodiment.

FIG. 7 is a diagrammatic representation of an example data structure 700 to represent selection criteria information that may be utilized by the VoIP module 300 of FIG. 3, in accordance with an example embodiment. As shown in FIG. 7, the example data structure 700 comprises fields 702 through 710.

"SELECTION_CRITERIA.BUYER.ID" field 702 is used to represent identification information associated with the buyer. "SELECTION_CRITERIA. BUYER.STATUS" field 704 is used to represent status information associated with the buyer. "SELECTION_CRITERIA.SELLER_REP.AVAILABILITY" field 706 is used to represent availability information associated with representatives at the seller's site. "SELECTION_CRITERIA. SELLER_REP.LANGUAGE" field 708 is used to represent spoken languages information associated with representatives at the seller's site. "SELECTION_CRITERIA. SELLER_REP.EXPERTISE" field 710 is used to represent area of expertise information associated with representatives at the seller's site.

It will be noted, that selection criteria information, as well as other information utilized by the VoIP module 300 of FIG. 3, may be represented utilizing a variety of techniques that may be available to a person skilled in the art.

Figure 8:
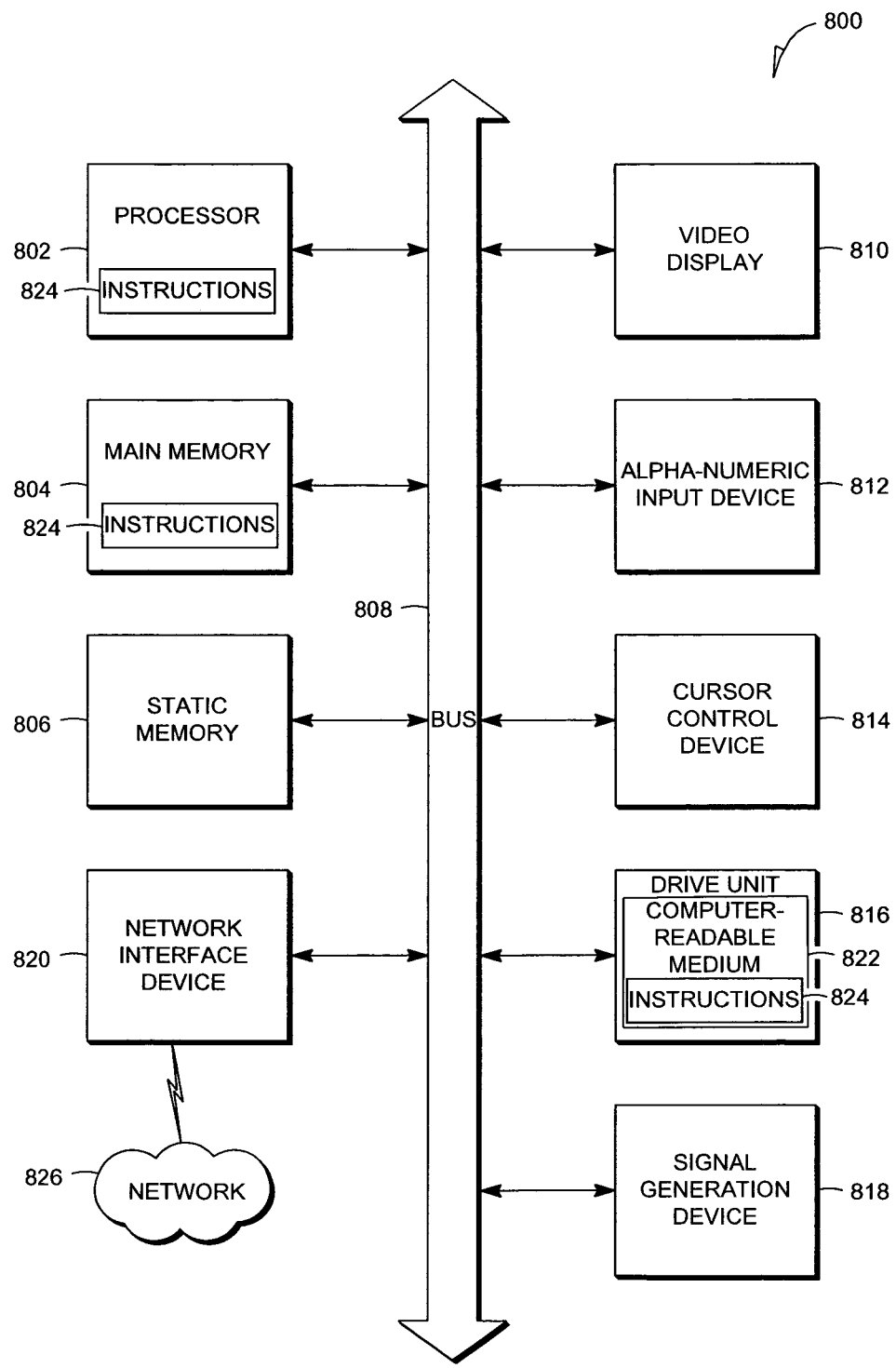
FIG. 8 is a diagrammatic representation of an example machine in the form of a computer system within which a set of instructions, for causing the machine to perform any one or more of the methodologies discussed herein, may be executed.

FIG. 8 shows a diagrammatic representation of a machine in the example form of a computer system 800 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alpha-numeric input device 812 (e.g., a keyboard), a user interface (UI) navigation device 814 (e.g., a cursor control device), a disk drive unit 816, a signal generation device 818 (e.g., a speaker) and a network interface device 820.

The disk drive unit 816 includes a machine-readable medium 822 on which is stored one or more sets of instructions and data structures (e.g., software 824) embodying or utilized by any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media.

The software 824 may further be transmitted or received over a network 826 via the network interface device 820 utilizing any one of a number of well-known transfer protocols (e.g., Hyper Text Transfer Protocol (HTTP)).

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of embodiments of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware.

Thus, a method and system to route a VoIP call to a representative at a provider's site have been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A call processing system comprising:
a pay per lead module, implemented using at least one processor to receive a request for a referral of a provider of a service type, the request for the referral indicated by a voice over Internet protocol (VoIP) call request;
a decision module, implemented using at least one processor, to determine, responsive to the VoIP call request and based on selection criteria stored in a data structure associated with an identification of a user, an identification of a suitable provider of the service type, the decision-module being to determine the suitable provider of the service type utilizing identification information associated with an initiator of the VoIP call request; and
a call routing module, implemented using at least one processor, to router a VoIP call to the suitable provider of the service type.

2. The system of claim 1, wherein the decision module is to:
determine availability of representatives associated with the suitable provider; and
determine a suitable representative, utilizing the determined availability.

3. The system of claim 2, wherein the decision module is to determine availability of the representatives based on on-line presence information associated with the representatives.

4. The system of claim 2, wherein the decision module is to determine the suitable representative utilizing spoken language information associated with the representatives.

5. The system of claim 2, wherein the decision module is to determine the suitable representative utilizing area of expertise information associated with the representatives.

6. A method comprising:
   receiving, via a user interface, a voice over Internet protocol (VoIP) call request, the VoIP call request being indicative of a request for a referral of a provider of a service type;
   responsive to the receiving of the VoIP call request determining, utilizing at least one processor and based on selection criteria stored in a data structure associated with an identification of a user who is an initiator of the VoIP call request, an identification of a suitable provider of the service type, the determining utilizing identification information associated with the initiator of the VoIP call request; and
   routing a VoIP call to the suitable provider of the service type.

7. The method of claim 6, further comprising:
   determining availability of representatives associated with the suitable provider; and
   determining a suitable representative, utilizing the determined availability of the representatives.

8. The method of claim 7, wherein the determining the availability comprises utilizing on-line presence information associated with the representatives associated with the suitable provider.

9. The method of claim 6, wherein the determining the identification comprises utilizing spoken language information.

10. The method of claim 6, wherein the determining the identification comprises utilizing area of expertise information associated with the representatives.

11. A machine-readable non-transitory storage medium having instruction data to cause a machine to perform operations comprising:
    receiving, via a user interface, a voice over Internet protocol (VoIP) call request, the VoIP call request being indicative of a request for a referral of a provider of a service type;
    responsive to the receiving of the VoIP call request determining, based on selection criteria stored in a data structure associated with an identification of a user who is an initiator of the VoIP call request, an identification of a suitable provider of the service type, the determining utilizing identification information associated with the initiator of the VoIP call request; and
    routing a VoIP call to the suitable provider of the service type.

12. An on-line transaction processing system, the system comprising:
    a pay per lead module, implemented using at least one processor, to receive a request for a referral of a provider of a service type, the request for a referral indicated by a voice over Internet protocol (VoIP) call request;
    a searchable listing index, implemented using at least one processor, to present voice over Internet protocol (VoIP) control to a user in response to a search request;
    a VoIP module, implemented using at least one processor, to:
       detect a VoIP call to a seller, the VoIP call initiated via the VoIP control;
       determine based on selection criteria stored in a data structure associated with an identification of the user, a suitable provider of the service type, the determining utilizing identification information associated with an initiator of the VoIP call request; and
       route a VoIP call to the suitable provider of the service type.

13. The system of claim 12, wherein the search request is a referral request and the VoIP call is to a provider, the provider being selected in response to the referral request.

14. The system of claim 12, wherein the search request is associated with an offering and the VoIP call is to a seller of the offering.

15. The system of claim 12, wherein the search request is associated with an offering and the VoIP call is initiated with a web page to display data related to the offering.

16. A method comprising:
    receiving, using at least one processor, a request for a referral of a provider of a service type, the request for the referral indicated by a voice over Internet protocol (VoIP) call request;
    presenting voice over Internet protocol (VoIP) control in response to a search request;
    detecting a VoIP call to a seller, the VoIP call initiated via the VoIP control;
    determining, utilizing at least one processor and based on selection criteria stored in a data structure associated with an identification of a user who is an initiator of the VoIP call request, a suitable provider of the service type representative associated with the seller, the determining utilizing identification information associated with the initiator of the VoIP call request; and
    routing a VoIP call to the suitable provider of the service type.

17. The method of claim 16, wherein the search request is a referral request and the VoIP call is to a provider, the provider being selected in response to the referral request.

18. The method of claim 16, wherein the search request is associated with an offering and the VoIP call is to a seller of the offering.

19. The method of claim 16, wherein the search request is associated with an offering and the VoIP call is initiated with a web page to display data related to the offering.

* * * * *